June 4, 1946.  R. L. WRIGHT, 2D  2,401,398
METHOD OF TESTING INSULATED CONDUCTORS
Filed Sept. 18, 1943
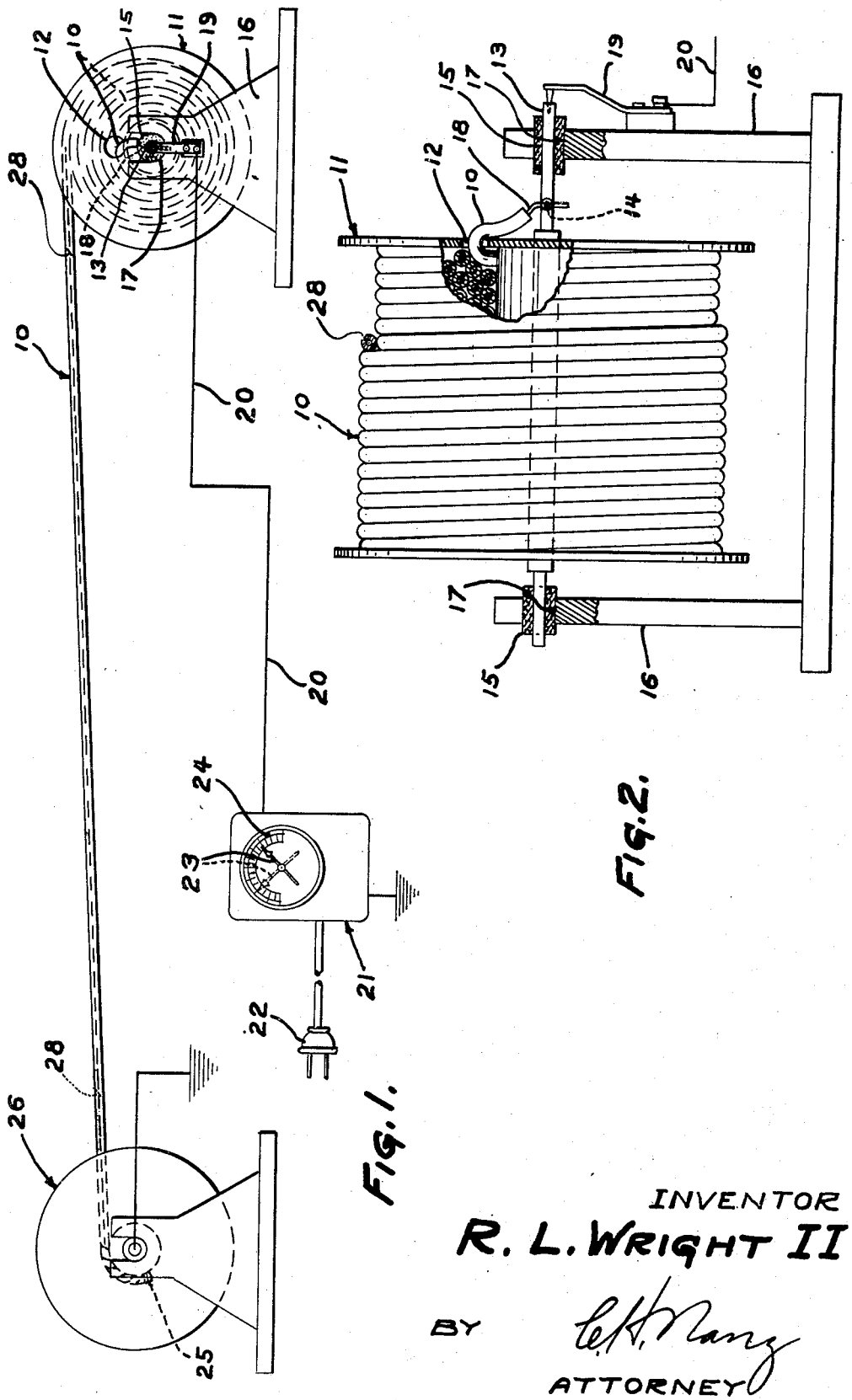
INVENTOR
R. L. WRIGHT II
BY
ATTORNEY Patented June 4, 1946

2,401,398

UNITED STATES PATENT OFFICE 2,401,398

METHOD OF TESTING INSULATED CONDUCTORS

Robert L. Wright, II, Dundalk, Md., assignor to Western Electric Company, Incorporated, New York, N. Y., a corporation of New York Application September 18, 1943, Serial No. 502,963

3 Claims. (Cl. 175—183)

This invention relates to methods of testing insulated conductors and more particularly to methods of locating faults in insulated conductors.

In the manufacture of insulated conductors, it is sometimes necessary to test the insulation to determine whether there are any faults therein and to analyze any faults that are discovered to determine the causes thereof, in order that the methods of manufacturing the conductor or the materials used may be modified to avoid such faults. Previously known methods of testing cables for faults in the insulation thereon used a high voltage which burned and charred the faults and rendered analysis of the faults difficult, if not impossible.

It is an object of this invention to provide new and improved methods of accurately locating faults in insulated conductors.

In one embodiment of the invention, faults in insulated conductors are located by winding such a conductor upon an insulated supply reel, wetting the insulation, drawing the conductor from the supply reel, grounding the wet insulation at a point a predetermined distance from the supply reel, continuously measuring the resistance from the end of the conductor core upon the insulated supply reel to the point at which the conductor is grounded, and noting the change in the resistance of the conductor as a fault in the insulation thereon approaches the point at which the insulation is grounded to locate the fault.

The invention may be clearly understood from the following detailed description, when taken in conjunction with the accompanying drawing, in which Fig. 1 is a diagrammatic view of an insulation testing apparatus for practicing a method embodying the invention; and Fig. 2 is a sectional view of a portion of the apparatus.

Referring to Fig. 1 of the drawing, an insulated conductor 10, of which only the outer surface of the insulation has been moistened thoroughly with water, soap solution or other medium capable of carrying a current along the outer surface of the insulation of the conductor, is coiled upon a supply reel 11 secured to a metal axle 13 having a bore 14 therethrough. Only the outer surface of the insulation of the conductor is moistened, though obviously the moisture may penetrate any holes present in the insulation. Except where such holes occur, the moisture does not affect the insulating value of the insulation. Bushings 15—15 of insulating material enclose the ends of the axle 13 and insulate the axle from standards 16—16 having openings 17—17 therein in which the bushings and the axle are rotatably mounted. The inner end of the conductor 10 is passed through an opening 12 formed in the reel 11 and the end of the conductor is bared. The bared end 18 thereof is passed through the bore 14 and is secured therein in any suitable manner to electrically connect the end 18 with the axle 13. A contact 19 bears against one end of the axle and is electrically attached to a conductor 20 to provide an electrical path to a resistance test set 21.

The resistance test set 21 is of a type well known to those skilled in the art and is provided with a plug-in 22 for obtaining current from any suitable source. The test set is adapted to measure the resistance in a given length of the conductor and has a pointer 23 which moves along a scale 24 to indicate the resistance of the measured length of the conductor. The outer end 25 of the wet insulated conductor is completely insulated, as by covering it with insulating tape, and is secured by any suitable means to a grounded takeup reel 26.

In practicing the invention with the above described apparatus, the outer surface of the insulation is thoroughly moistened by dipping it and the reel 11 into a tank of an electroconductive fluid before mounting the reel upon the axle 13. The axle 13 is then secured in the reel 11 and mounted in the openings 17—17 with only the bushings 15—15 contacting the standards 16—16. One end of the axle engages the contact 19 so that the end 18 of the conductor is electrically connected to the test set 21. The other end 25 of the conductor is insulated from and secured to the grounded takeup reel 26. The plug-in 22 of the test set 21 is connected to a source of current, and the takeup reel 26 rotated to draw the conductor 10 thereon from the supply reel 11.

Current tends to flow from plug 22 to the set 21, through the conductor 20, the contact 19, the axle 13 and the conductor 10. However, since the end 25 of the conductor 10 is completely insulated, the current cannot pass through the core of the insulated conductor to the grounded takeup reel 26. Likewise, if the insulation on the conductor 10 is satisfactory, the current cannot pass therethrough.

However, when a fault 28 occurs in the insulation, the current passes from the core of the insulated conductor, through the fault 28, and thence along the wet surface of the insulation to the grounded takeup reel 26. Thus, when the fault 28 is on the insulated supply reel 11, as shown in full lines in Fig. 1, the path of the current from the fault 28 along the wet outer surface of the insulated conductor to the grounded takeup reel 26 will be long and the resistance correspondingly high. The pointer 23 will then be in position, such as is shown in full lines in Fig. 1, to indicate the high resistance of the circuit.

As the fault 28 passes from its position on the supply reel 11 to the position on the grounded takeup reel 26, as shown in dotted lines in Fig. 1, the length of the path of the current along the wet outer insulation of the conductor 10 will be decreased, thus the resistance of the path will decrease correspondingly and the pointer 23 will indicate the change in resistance by moving from its position shown in full lines toward that shown in dotted lines in Fig. 1.

As the fault 28 contacts the grounded takeup reel, or the coils of the wet insulated conductor 10 already wound on the takeup reel, depending, of course, on the amount of the conductor already wound on the takeup reel, the current passes directly from the fault to the takeup reel or over a short path along the wet outer surfaces of the coils of the insulated conductor to the takeup reel. The resistance of the circuit from the fault 28 to the grounded takeup reel will not change materially after the fault contacts the takeup reel or the coils thereon, and the pointer 23 will remain stationary. When the pointer 23 discontinues its movement, which indicates the contact of the fault 28 with the grounded takeup reel, the fault will just be on the takeup reel and can be wrapped with an insulating tape (not shown) to mark the location of the fault for analysis and to prevent passage of the current from the fault to the other coils on the takeup reel or directly to the takeup reel. The remaining portion of the cable then can be tested in a similar manner, to locate any further faults.

A low potential current may be used very satisfactorily in practicing the invention described hereinabove. Therefore, such a method of testing is very satisfactory in locating faults in the insulations of conductors without charring or otherwise damaging the faults, and the faults in the insulation may be analyzed much more easily than can those which were located by heretofore known testing means. This method locates the faults without damage thereto quickly and accurately.

What is claimed is:

1. The method of locating faults in insulated conductors, which comprises wetting the exterior of a supply of the insulated conductor comprising conductive core and an insulating cover thereover, insulating the supply of the insulated conductor from the ground, withdrawing an end of the insulated conductor from the supply, insulating said end of conductor from ground, continuously advancing the conductor from the supply, continuously impressing a voltage between the end of the conductive core at the supply and the moving insulating cover at a test point a predetermined distance from the supply, and continuously measuring the electrical resistance between the last-mentioned end of the conductive core and said test point, whereby if a fault is present in the insulating cover, it may be located from the drop in the resistance as the portion of the insulated conductor having the fault is advanced from the supply to said test point.

2. The method of locating faults in an insulating cover of an insulated conductor having a conductive core enclosed by the insulating cover, which comprises wetting completely the surface of an insulating cover of such an insulated conductor, insulating a supply of the insulated conductor from the ground, insulating one end of the conductive core of the insulated conductor from the ground, continuously advancing the insulated conductor from the supply starting with said insulated end of the conductive core, impressing a voltage between the other end of the conductive core and the moving wet insulating cover at a test point a predetermined distance from the supply of the insulated conductor, and continuously measuring the electrical resistance between the last-mentioned end of the conductive core of the insulated conductor and said test point.

3. The method of locating faults in insulated conductors, which comprises continuously advancing from a supply an insulated conductor having a conductive core and an insulating cover having a wet surface and also having a fault therein, grounding the insulating cover of the advancing conductor at a test point a predetermined distance from the supply, insulating the conductor from the ground except at said test point, continuously passing an electric current through the conductive core of the wet insulated conductor from the end at the supply thereof, through the fault in the insulation of the insulated conductor and thence along the wet surface of the insulation to ground, and continuously measuring the resistance of the current path so that the fault may be located by the change in resistance of the current path as the fault approaches the test point at which the insulation is grounded.

ROBERT L. WRIGHT, II.